April 28, 1964
A. H. CASTON ETAL
3,130,795
AGRICULTURAL THINNING DEVICES
Filed Aug. 21, 1961
2 Sheets-Sheet 2
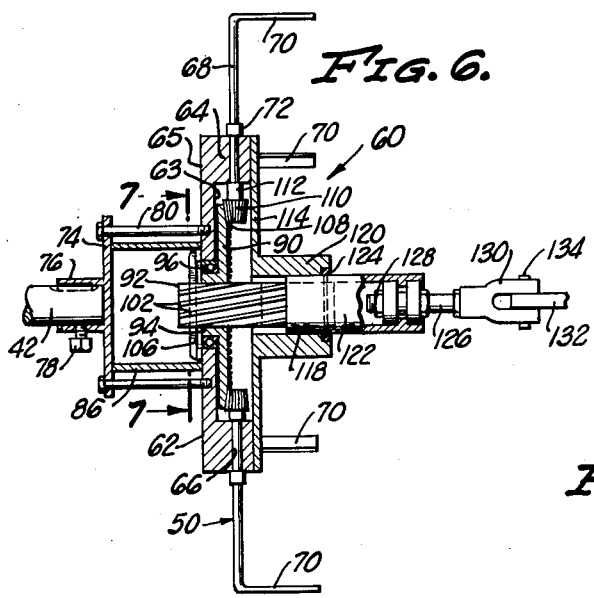
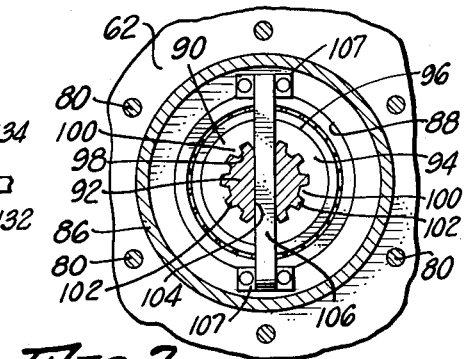
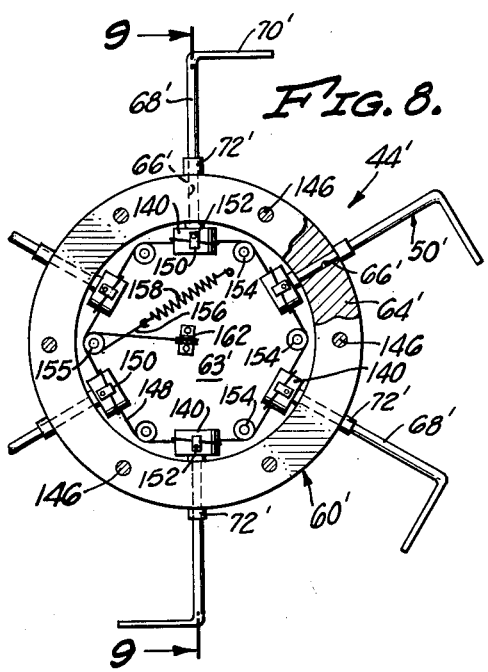
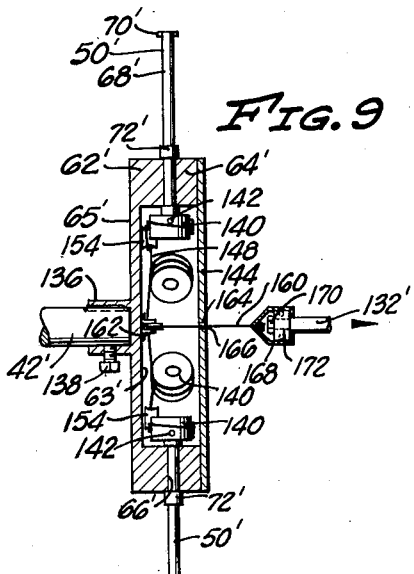
INVENTOR.
ARTHUR H. CASTON,
DONALD COX
BY O'BRIAN & BLACKHAM
ATTORNEYS United States Patent Office 3,130,795
Patented Apr. 28, 1964

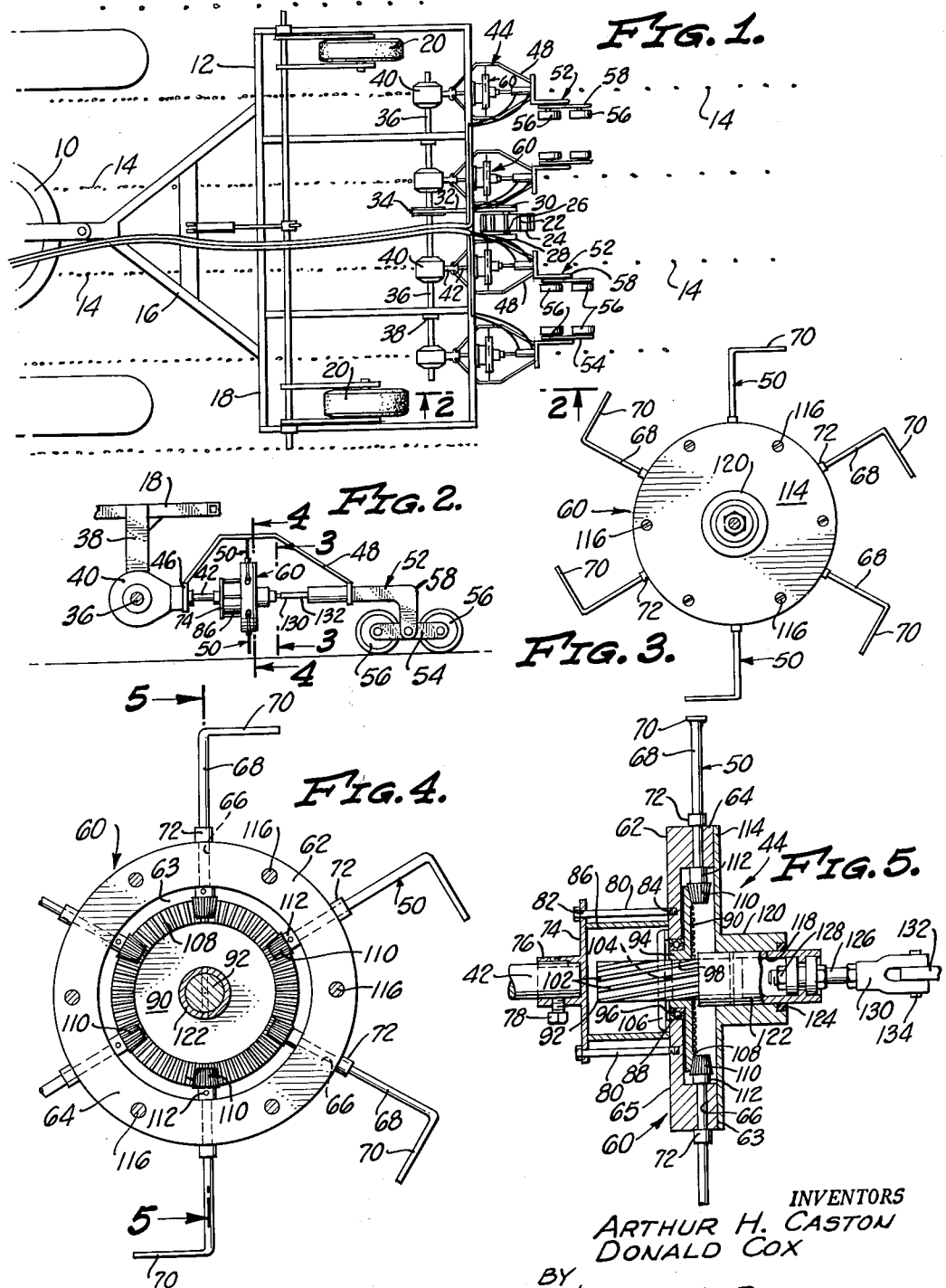

3,130,795
AGRICULTURAL THINNING DEVICES
Arthur H. Caston, 333 W. Firn, Calipatria, Calif., and Donald Cox, 590 Russell Road, Brawley, Calif.
Filed Aug. 21, 1961, Ser. No. 132,914
6 Claims. (Cl. 172—109)

This invention relates to cultivating devices used in mechanized agriculture. More particularly, it relates to infinitely and continuously adjustable thinners for use with row crops.

It has long been known to thin or block row crops, such as cotton or sugar beets, by moving a rotating thinner head along the row of plants. The thinner head rotates in a plane generally transverse to the row of plants, and carries a number of spaced cutters or scythes which chop out sections of the row of plants. The primary object of such thinning is to obtain the optimum number and spacing of plants in a given area for best growth and greatest productivity. Such thinning can, of course, be laboriously performed by hand; but the increasing cost and other difficulties of agricultural labor have emphasized the need for efficient and effective mechanized thinning.

Thinning of crops may serve a number of purposes, depending upon the nature of the crop, the manner in which it was planted, its state of growth, and similar factors. Frequently, for example, thinning operations are utilized to limit or control the growth of weeds or other undesired plants in the crop. Also, such operations may be used to block the plants so as to leave them in blocks of desired density and length with open spaces of predetermined length or spacing in the row between the blocks.

In all such operations, a common difficulty lies in the fact that the density of the crop is not constant. Because of differences in the terrain, the soil, the manner of planting, irrigation, cultivation, and other factors, the density of plants, and of weeds as well, will not only vary from field to field, but also will vary from row to row within a field, and will vary from place to place within a row.

It has been known, in prior mechanized thinners, to provide for such density variation by providing cutter knives or scythes of varying blade lengths, so that the degree of cut, or amount of thinning, can be varied by replacing one set of cutters with another set of different blade length in order to vary the width of each cut made by the rotating thinner head. It has also been known to provide thinner or cutter heads in which the shaft of each cutter of scythe is secured to the thinner head by releasable set screws or like means so that the width of each cut may be varied by manually releasing the shaft of each scythe and turning the scythe so that the blade presents a different angle to the plane of rotation of the thinner head. For example, with a thinner head rotating in a plane at right angles to the row, the maximum degree of cut would be obtained with the blade at right angles to the plane of rotation of the thinner head, and the minimum cut with the blade parallel to the plane of rotation of the thinner head. Similar variations of cut, of course, may be obtained at different angles with thinner heads rotating in planes at angles other than right angles to the row.

The commercial efficiency and utilization of such prior thinners has been limited by the fact that in a crop of varying density the choice must frequently be made between obtaining optimum thinning of the crops and obtaining optimum minimization of labor and operating costs. When a variation in plant density in a row occurs, the operator must choose between stopping operations to manually replace or adjust each cutter blade and continuing operations with a degree of cut that does not provide optimum thinning. There has been great need for obviating, at each variation of plant density, such loss either of maximum labor and cost efficiency or of optimum thinning.

It is a general object of this invention to meet such need.

It is a further object of this invention to provide thinning devices in which the degree of cut may be changed without individual manual adjustment or replacement of each cutter or scythe. It is a still further object of this invention to provide thinning devices in which the amount of cut of all cutters may be adjusted simultaneously by simultaneously changing the angles of all cutter blades to the plane of rotation of the thinner head.

It is a further object of this invention to provide thinning devices in which the degree of cut of all cutters may be infinitely varied between minimum and maximum cut.

It is a still further object of this invention to provide thinning devices in which the degree of cut may be changed without interrupting operation of the devices.

These and other objects and advantages of the invention will appear more fully from the remainder of this description, including the appended claims and the accompanying drawings, in which:

FIG. 1 is a top plan view of thinners according to the invention mounted on a tractor-drawn trailer for thinning a row crop;

FIG. 2 is a side plan view of a thinner and its carriage taken along line 2—2 of FIG. 1;

FIG. 3 is an elevational view of a cutter head according to the invention, partially sectioned along line 3—3 of FIG. 2;

FIG. 4 is a partially sectioned view of the cutter head taken along line 4—4 of FIG. 2, with the cover plate removed;

FIG. 5 is a cross-sectional view of a cutter head of the invention in minimum-cut position, taken along line 5—5 of FIG. 4;

FIG. 6 is a cross-sectional view, similar to FIG. 5, of a cutter head of the invention in maximum-cut position;

FIG. 7 is a sectional view of a cutter head taken along line 7—7 of FIG. 6;

FIG. 8 is a sectional view, similar to FIG. 4, of a modified form of cutter head of the invention; and FIG. 9 is a cross-sectional view of a modified form of cutter head of the invention in a minimum-cut position, taken along line 9—9 of FIG. 8.

In all figures of the drawings like numerals are used to designate like parts where convenient for purposes of illustration and explanation. The accompanying drawings are not to be taken as limiting this invention; those skilled in the art to which this invention pertains will realize that these drawings are intended to illustrate the nature of the invention and to designate clearly presently preferred embodiments of this invention. Obviously the dimensions and relative sizes of the various parts of the constructions shown can be changed to adapt the invention for different uses and conditions.

As an aid to understanding the invention it may be stated in summary form that it concerns cultivating devices having a rotor bearing a number of radially extending cutters, each of the cutters having a shaft turnably mounted on the rotor and a blade at the outer end of the shaft extending away from the axis of the shaft, and means adjacent the rotor engaging the inner end portion of the shaft for turning the shaft so as to alter the angle between the cutter blade and the plane of rotation of the rotor, the turning means engaging each shaft being connected to control means for operatively moving the turning means and thereby changing the angle of each cutter blade.

In the drawings, FIG. 1 indicates a tractor 10 drawing a trailer 12 along rows 14 of plants. The trailer 12, which may be of any conventional type, is connected to the tractor 10 by yoke 16 attached to the trailer frame 18 which is supported by wheels 20 and drive wheel 22. The drive wheel 22, which preferably includes prominent transverse treads 24 for increased traction, is rotatably mounted on stub axle 26, which is journalleed at one end in frame member 28 extending downwardly from the trailer frame 18. The other end of the stub axle 26 bears gear 30 operatively linked by chain 32 to gear 34 on transverse shaft 36 for rotating transverse shaft 36.

The transverse shaft 36 is journalled through frame members 38 extending downwardly from the trailer frame 18. It extends through conventional gear boxes 40, each of which is connected to the drive shaft 42 of a thinner 44 of the invention. The gear boxes 40 translate rotation of the transverse shaft 36 into rotation of the drive shafts 42, and are free for minor movement relative to each other about the axis of the transverse shaft 36. This drive means illustrated in FIG. 1 for rotating the thinners 44 can of course be replaced by other drive means, such as individual power sources for each thinner 44 or conventional power take-offs from the tractor 10.

The thinners 44 preferably are mounted as illustrated in FIG. 2. The drive shaft 42 connecting the thinner 44 to the gear box 40 is rotatably journalled through bearing 46 in the forward end of frame 48. The two sides of the frame 48, which join at each end of the frame 48, are generally arched over the thinner 44, providing sufficient clearance for rotation of the scythes 50, and the trailing end of the frame 48 is secured to the thinner carriage 52. The thinner carriage 52 comprises support member 54, on the two ends of which tandem wheels 56 are rotatably mounted, which is pivotally mounted intermediate its ends on the body member 58, which in turn is attached to the thinner frame 48; thus providing an efficient support for the thinner 44, in combination wtih the frame 48 and the drive shaft 42 from the gear box 40, which easily and evenly follows the contour of each row 14 of plants.

The thinners 44 of the invention can be mounted, if preferred in particular circumstances of use, on the tractor itself or in any other suitable manner of carriage; and as many or as few thinners 44 may be mounted and driven in common as desired. It is presently believed, with most row crops of normal density variation, that four to six thinners provide the optimum number of rows to which a single operator can give his attention. Of course, if two or more thinners 44 are mounted in tandem along a single row, as for example to obtain an unusual blocking or trimming effect, a correspondingly greater number may be tended by a single operator.

As illustrated in FIG. 1 it is preferred that each thinner 44 be mounted directly above the row 14 of the crop, to accomplish the thinning indicated by the density of plants in the rows 14 forward of the thinners 44 as compared to the thinned portions of the rows 14 to the rear. The complete cutter head 60 of each thinner 44, which includes the radial cutters or scythes 50, is preferably mounted substantially at right angles to the row 14 of the crop; however, the cutter head 60 may be mounted obliquely to the row 14 to compensate for the forward motion of the tractor 10 and the thinner 44 in operation, so that upon rotation of the cutter head 60 the radial scythes 50 pass through the row 14 of crop at right angles; or the cutter head 60 may be mounted at other angles as desired.

The thinner 44 of the invention includes the complete cutter head 60, which comprises the rotor 62, connected to the drive shaft 42 for rotation thereby, and the radially extending cutters or scythes 50 carried by the rotor 62. For cultivation of most conventional row crops it is presently preferred that three to eight scythes 50 be included in each cutter head 60; but with changes of dimensions and relative speed of rotation other numbers of scythes 50 may be utilized.

The rotor 62 preferably is formed as a circular plate having an enlarged rim or hub portion 64 on its face side 63. The rim 64 is formed with a number of spaced radial apertures 66 therethrough corresponding to the number of scythes 50 to be carried.

Each cutter or scythe 50 includes a shaft 68 and a blade 70 which is formed on the outer end of the shaft 68 and extends away from the axis of the shaft 68. The blade 70 preferably extends away from the shaft 68 at substantially right angles, so as to present its cutting edge in a horizontal position in normal operation of the cutter head 60. The shafts 68 of the scythes 50 are turnably journalled, intermediate their ends, through the radial apertures 66 in the rim 64. The shafts 68 preferable include flanges 72, of greater diameter than the apertures 66, formed thereon so as to be located radially outwardly from the rim 64 to prevent radially inward movement of the shafts 68.

In the presently preferred embodiment of the invention the rotor 62 is connected for rotation to the drive shaft 42 by means of the plate 74. The plate 74 has attached thereto the boss 76 in which the end of the drive shaft 42 is inserted and secured, as by means of set screw 78 extending through the side of the boss 76. The plate 74 is secured to the rotor 62 by means of the elongated bolts 80, extending through holes 82 through the peripheral portion of the plate 74, and threaded in aligned threaded cavities 84 in the back side 65 of the rotor 62. The cylindrical shield 86 encloses the space between the plate 74 and the rotor 62, immediately inwardly of the bolts 80, and is formed in a cylindrical shape such that upon tightening of the bolts 80 oil-tight seals are formed between the shield 86 and the rotor 62 and the plate 74.

The rotor 62 is of ring-like shape, being formed with a central circular aperture or hole 88 therethrough which is aligned with the drive shaft 42 and the circular shield 86. Turning means for the scythes 50 includes the gear member 90 and the splined cylinder 92 extending through the aperture 88. The gear member 90 is formed generally as a disc, located adjacent the face side of the rotor 62 within the rim 64, and having a boss 94 around its center. The boss 94 has a bearing surface 96 formed on its outer side and is rotatably journalled in the aperture 88 through the rotor 62. The gear member 90 has a central hole 98 therethrough, extending through the boss 94, and aligned with the drive shaft 42. The periphery of the hole 98 is formed with a number of teeth 100 thereon, resembling an internal gear, so as to be capable of acting as a cam means for following splined cylinder 92.

The splined cylinder 92, having spiralled flanges 102 thereon which mesh with the teeth 100, extends through the hole 98 in gear member 90. Axial movement of the splined cylinder 92, with the flanges 102 acting as cams and the teeth 100 acting as cam followers, thus causes rotation of the gear member 90.

The splined cylinder 92 has a slot 104 formed therein across its diameter. Slot 104 extends through splined cylinder 92 from its end adjacent the drive shaft 42 for a distance slightly less than the distance between the plate 74 and the back side 65 of the rotor 62. The extension of the slot 104 through the end of the cylinder 92 facilitates the easy assembly and disassembly of thinner 44. Bar 106 is secured at each end, as by means of clamps 107, to the back side 65 of the rotor 62, and extends through the slot 104. The bar 106 thus permits axial movement of the splined cylinder 92 but prevents rotation of the splined cylinder 92 relative to the rotor 62.

Gear member 90 is formed with toothed gear surface 108 adjacent its periphery on its side remote from the face side 63 of rotor 62, thus forming in effect a ring gear or circular rack. Pinion gears 110 are secured to the inner ends of each scythe shaft 68, as by means of clamps 112, and located so as to mesh with gear surface 108 on gear member 90. Rotation of gear member 90 relative to rotor 62, caused by axial movement of splined cylinder 92, thus causes rotation or turning of the scythe shafts 68. The clamps 112 on shafts 68 prevent radially outward movement of the scythe shafts 68. If desired for economy of manufacture, these cooperating gear means (pinions 110 and gear surface 108 on member 90) may be formed as segments of complete pinions and complete racks or ring gears, and still suffice to provide a desired 90° turning of each scythe shaft 68.

Cover plate 114 is secured to rim 64, as by bolts 116, to form an oil-tight seal therewith, and it extends across the face side of rotor 62 to enclose the space in which gear member 90 and pinions 110 are located. Cover plate 114 has a central circular hole 118 formed therethrough, and surrounded by boss 120 on cover plate 114, which is aligned with splined cylinder 92. Cylindrical casing 122, attached to the end of splined cylinder 92 remote from the drive shaft 42, and aligned therewith, is slidably and rotatably journaled through hole 118 and boss 120 so as to be capable of both rotary and axial movement therein. Bearing seal 124 on the interior of boss 120 provides an oil-tight seal around casing 122.

The end of casing 122 remote from splined cylinder 92 extends outside cover plate 114 and is secured, as by means of bolt 126 and nut 128, to swivel means such as conventional swivel yoke 130. Swivel yoke 130, which preferably includes internal bearing means (not shown) holding bolt 126 to permit easy rotation of yoke 130 relative to bolt 126, is in turn secured to control shaft 132, as by means of pin 134.

Control shaft 132 represents the means by which the operator controls the degree of cut of the thinner 44. It may be the end of a hydraulic ram powered from the tractor's hydraulic system, the end of a conventional Bowden wire control cable, or any equivalent means, such as a manually-operated lever, for obtaining controlled reciprocal movement. Movement of control shaft 132 toward cutter head 60 causes axial movement of splined cylinder 92 relative to the rotor 62. This effects axial movement of the spiral flanges 102 on splinded cylinder 92 which are followed by the teeth 100 on gear member 90, thereby causing rotation of gear member 90 relative to rotor 62. In turn this relative rotation of gear member 90, by means of pinions 110 on scythe shafts 68 meshing with gear surface 108 on gear member 90, causes scythe shafts 68 to turn, thereby altering the angles between the cutter blades 70 (which, of course, preferably are aligned with one another) and the plane of rotation of rotor 62. Swivel yoke 130 permits this relationship and operation to occur, when the entire cutter head 60 is being rotated in operation by drive shaft 42, without twisting or turning of the control shaft 132. The relatively sturdy and simple construction of thinner 44 is found to be aided for easy and durable operation by bathing the interior spaces, enclosed by rotor 62, cover plate 114, cylindrical shield 86, and plate 74, with lubricating oil.

The control shafts 132, as indicated in FIG. 1, preferably are operated individually by the tractor driver, who thus can not only operate the tractor but can also adjust the degree of thinning or blocking in each individual row 14 of plants. Such adjustment is affected simply by in-and-out reciprocation of the control shaft 132. As illustrated in FIG. 5, when control shaft 132 is extended its maximum distance toward drive shaft 42, thus moving splined cylinder 92 adjacent plate 74, the gear member 90 is rotated relative to rotor 62 so as to turn the scythe blades 70 parallel with the plane of rotation of rotor 62.

When rotor 62 is mounted so as to cut through the row 14 at right angles (as discussed above), this position provides the minimum degree of cut. When control shaft 132 and splined cylinder 92 are reciprocated to their greatest extent away from drive shaft 42, as illustrated in FIG. 6, the scythe blades 70 are turned perpendicular to the plane of rotation of rotor 62, thus providing in perpendicular-cut operations, the maximum degree of cut. Any of an infinite number of degrees of cut between these extremes may be achieved simply by movement of the control shaft 132. Of course, if cutter head 60 is mounted in operation at other positions so as to provide other than perpendicular cuts through the rows 14, correspondingly altered positions of the scythe blades 70 relative to the plane of rotation of the rotor 62 will provide the maximum and minimum cuts; but the general relationships in operation of the parts of the thinner 44 remain the same.

Although it is preferred for maximum efficiency that the thinners 44 be controlled individually by the tractor driver, they can also be controlled in groups of two or more as units by connecting their control shafts 132 to a common hydraulic or mechanical control. In some operations it may be preferred that adjustment of the degrees of cuts of thinners 44 be made by a separate operator seated on the trailer 12. Similarly, it should be noted that, although such use is unusual and not preferred, the thinners 44 of the invention also may be used for selective degrees of thinning or cultivation in non-row crops.

FIGS. 8 and 9 illustrate a modified form of the thinner 44' of the invention in which parts similar to the parts illustrated in the preceding figures of the drawings are denominated by the primes of their numerals used in the preceding figures of the drawings, and which, except as hereinafter described, is constructed and operates in the same manner as the thinner 44 described above.

The drive shaft 42' inserted in the boss 136 formed on the center of the back side 65' of the rotor 62', is secured thereto as by means of set screw 138 extending through the side of boss 136. Each scythe 50' includes shaft 68' and blade 70' extending away from the axis of shaft 68'. The shafts 68' are turnably journalled, intermediate their ends, through the radial apertures 66' in the rotor rim 64', and they include flanges 72' of greater diameter than the apertures 66', located on each shaft 68' outwardly from the rim 64' to prevent radially inward movement of the shaft 68'.

Spools 140 are secured to the inner ends of the shafts 68', as by means of shear pins 142 extending through the spools 140 and the shafts 68'. The spools 140, by engagement with the rim 64' similar to the engagement of clamps 112 with the rim 64 of the presently preferred embodiment of the invention, prevent radially outward movement of the shaft 68'. The space between the face side 63' of the rotor 62' and the rim 64', in which the spools 140 are located, is enclosed by cover plate 144 which is secured in an oil-tight seal to rim 64', as by means of bolts 146. This interior space enclosed by cover plate 144 preferably is bathed in lubricating oil.

The means for turning shafts 68' includes the cable means 148 which engages each spool 140, as by making one or more turns around the spool 140 generally perpendicular to the axis of the shaft 68' and the spool 140. The cable 148 preferably is secured against slippage on the spool 140 by means of clamp 150 held on spool 140 by screw 152. The portions of the cable 148 connecting adjacent spools 140 pass over peripheral pulleys 154 mounted on the face side 63' of the rotor 62' to align the cable 148 with each spool 140. The cable 148 thus engages each of the spools 140, and extends around the periphery of the face side 63' of the rotor 62' so that axial movement of the cable 148 is capable of causing a desired turn of up to 90° of each shaft 68'. This central concentric portion of the cable 148, and the spools 140, thus serve functions analogous to the concentric gear surface 108 and the pinions 110.

At the point where the two end portions of the cable 148 meet they are turned around common pulley 155, which is mounted and located in the same manner as peripheral pulleys 154 but preferably is double-tracked, so as to extend generally toward the center of the face side 63′ of the rotor 62′. The working end 156 of the cable 148 is attached to one end of coil spring means 158. The other end of coil spring means 158 is anchored to the face side 63′ of the rotor 62′. The other end portion of cable 148 passes under central pulley 162, mounted at the center of the face side 63′ of rotor 62′ and aligned with drive shaft 42′, and passes at right angles around central pulley 162 out through hole 164 in cover plate 144 in alignment with drive shaft 42′. Bearing seal 166, mounted on cover plate 144 in hole 164, provides an oil-tight seal with cable 148. The bitter end 160 of cable 148, outside the cutter head 60′, is secured to conventional swivel means such as swivel joint 168. Swivel joint 168 in turn is connected to control shaft 132′, as by means of nut 170, and preferably includes internal bearing means 172 to permit easy rotation of the bitter end 160 of cable 148 relative to control shaft 132′ without twisting of cable 148.

This modified form of the thinner 44′ of the invention operates generally in the same manner as the thinner 44 described above. Reciprocal axial movements of the control shaft 132′ cause reciprocal axial movement of the cable 148, which is capable of turning the scythes 50′ through the 90° between their minimum and maximum cut positions. The thinner 44′ preferably is constructed so that the resilient coil spring means 158 biases the cable 148, and thereby the scythes 50′, toward the minimum-cut position illustrated in FIGS. 8 and 9. The engagement of the scythe blades 70′ with the plants or soil being cut of course also biases them toward this minimum-cut position; thus, only the tension or force exerted by moving control shaft 132′ outwardly, as indicated by the arrow in FIG. 9 adjacent control shaft 132′, turns the scythes 50′ to any of the desired degrees of cut between the minimum-cut position and maximum-cut position.

With this form of the thinner 44′, as well as with the form of thinner 44 previously described, the adjustment in the widths of the cuts made by the scythes 50 and 50′ may be made while the thinner 44′ or 44 is being operated, without interrupting such operation, simply and securely by moving control shaft 132 or 132′.

The invention may be utilized with varying speeds of rotation of the cutter head 60 or 60′ in relation to the speed of movement along the row 14 of a crop, and the size of the maximum and minimum cuts may be varied by utilizing interchangeable scythes 50 or 50′ of different dimensions. Similarly, in the modified form of the thinner 44′, if desired because of the number of scythes 50′ borne on the rotor 62′, more than one cable means 148, each engaging one or more spools 140, may be employed and connected to a single control shaft 132′; and in the previously-described form of thinner 44 the engagement between the gear member 90 and the shaft 68 may be achieved by a member comprising, in effect, a single gear tooth engaging a single gear slot rather than the preferred form of gearing illustrated in FIGS. 4 and 5.

Without further elaboration, the foregoing will so fully explain the invention that others may, by applying current knowledge, readily adapt the same, including its inherent economy, realibility and durability, for use under various conditions of service.

We claim:

1. An agricultural thinning device comprising:
   a rotor having an axis of rotation;
   a scythe extending outwardly from said rotor, said scythe having a shaft turnably mounted on said rotor and having a blade attached to the outer end of said shaft, said blade extending transversely away from said shaft, turning means operably connected to said shaft of said scythe for turning said shaft so as to alter the angle between said blade of said scythe and the plane of rotation of said rotor, said turning means comprising first movable means located adjacent the periphery of said rotor, said first movable means being capable of generally concentric movement relative to said rotor, said rotor being formed with an aperture extending around the center of rotation thereof, said first movable means comprising a ring gear rotatably mounted on said rotor, said ring gear having a central aperture therethrough coaxial with said rotor and having teeth mounted thereon around said central aperture;

second movable means coaxial with said rotor and extending axially away from said rotor, said second movable means being capable of general axial movement relative to said rotor and being operatively connected to said first movable means whereby axial movement of said second movable means is capable of moving said first movable means generally concentrically relative to said rotor, said second movable means being connected to control means, said second movable means comprising a cylinder slidably mounted within said central aperture in said ring gear extending through said aperture in said rotor, said cylinder having splines thereon engaging said teeth on said first movable means whereby sliding axial movement of said cylinder is capable of rotating said ring gear relative to said rotor;

cooperating means mounted on said shaft coaxially therewith and engaging said first movable means, said cooperating means being adapted to be turned by generally concentric movement of said first movable means relative to said rotor, said cooperating means comprising a pinion mounted on said shaft;

and control means operatively connected to said turning means for operating said turning means.

2. An agricultural thinning device as described in claim 1, wherein said cylinder is formed with a slot extending across its diameter, and including a bar attached to said rotor across said aperture through said rotor, said bar extending through said slot in said cylinder so as to hold said cylinder against rotation relative to said rotor.

3. An agricultural thinning device comprising: a rotor having an axis of rotation; a gear member rotatably mounted on said rotor and coaxial therewith, said gear member having a concentric curved rack mounted on the side thereof; cam means mounted on said rotor so as to be held against rotation relative to said rotor and so as to be axially movable with respect to said rotor; cam follower means mounted on said gear member and engaging said cam means, said cam means and said cam follower means being formed so that axial movement of said cam means is capable of rotating said gear member relative to said rotor; a plurality of cutters, each of said cutters including a shaft turnably mounted on said rotor and a blade attached to one end of said shaft located radially outwardly from said rotor, said blade extending transversely away from said shaft; pinions mounted on said cutter shafts and engaging said rack, whereby rotation of said gear member relative to said rotor is capable of turning said shafts so as to alter the angle between said blades and the plane of rotation of said rotor; and connecting means extending away from said rotor and attached to said cam means for moving said cam means axially with respect to said rotor.

4. An agricultural thinning device as described in claim 3, wherein said gear member is formed with a hole therethrough at its center of rotation, said rotor is formed with an aperture therethrough at its center of rotation, said cam means comprise a cylinder coaxial with said rotor and axially slidably mounted in said hole in said gear member and extending through said aperture in said rotor, said cylinder having splines formed thereon, and said cam follower means comprise teeth mounted on said gear member around said hole through said gear member, said teeth engaging said spline on said cylinder.

5. An agricultural thinning device as described in claim 4, wherein said cylinder is formed with a slot extending across its diameter, and including a bar mounted on said rotor across said aperture through said rotor, said bar extending through said slot in said cylinder so as to hold said cylinder against rotation relative to said rotor; a boss mounted on said gear member through which said hole extends, said boss being rotatably journalled in said aperture through said rotor; and a rim mounted on the periphery of said rotor, said rim having radial apertures formed therethrough and said cutter shafts, intermediate said pinions and said blades, being turnably journalled through said radial apertures.

6. An agricultural thinning device as described in claim 5, wherein said connecting means comprise a casing coaxial with said rotor and a swivel yoke, one end of said casing being attached to said cylinder and the other end of said casing being attached to said swivel yoke, and including: flanges on said cutter shafts radially outwardly of said rim, said flanges being of greater diameter than said radial apertures through said rim so as to hold said shafts against radially inward movement; demountable clamps holding said pinions on said shafts, said clamps and said pinions being of greater diameter than said radial apertures through said rim so as to hold said shafts against radially outward movement; a plate attached to said rotor so as to extend across the axis of said rotor at a point spaced away from the side of said rotor remote from said casing; and a boss attached to the side of said plate remote from casing, said boss being adapted to engage a drive shaft coaxial with said rotor for rotation of said rotor.

References Cited in the file of this patent
UNITED STATES PATENTS

| | | |
|---|---|---|
| 1,302,015 | Dewey | Apr. 29, 1919 |
| 1,316,862 | Persson | Sept. 23, 1919 |

OTHER REFERENCES

German application No. K20,514, printed Aug. 30, 1956.